(12) United States Patent
Paul et al.

(10) Patent No.: US 9,275,054 B2
(45) Date of Patent: Mar. 1, 2016

(54) SYSTEMS AND METHODS FOR SEARCHING MEDIA CONTENT

(75) Inventors: John Paul, Palo Alto, CA (US); Myles Cagney, Novato, CA (US); Peter Mark Hennessy, Novato, CA (US)

(73) Assignee: Sling Media, Inc., Foster City, CA (US)

( * ) Notice: Subject to any disclaimer, the term of this patent is extended or adjusted under 35 U.S.C. 154(b) by 1058 days.

(21) Appl. No.: 12/648,024

(22) Filed: Dec. 28, 2009

(65) Prior Publication Data

US 2011/0158610 A1    Jun. 30, 2011

(51) Int. Cl.

| | | |
|---|---|---|
| H04N 9/80 | (2006.01) | |
| H04N 5/76 | (2006.01) | |
| G06F 17/30 | (2006.01) | |
| H04N 21/462 | (2011.01) | |
| H04N 21/472 | (2011.01) | |
| H04N 21/482 | (2011.01) | |

(52) U.S. Cl.
CPC .... *G06F 17/30029* (2013.01); *G06F 17/30038* (2013.01); *G06F 17/30053* (2013.01); *G06F 17/30781* (2013.01); *H04N 5/76* (2013.01); *H04N 21/4622* (2013.01); *H04N 21/47214* (2013.01); *H04N 21/4828* (2013.01)

(58) Field of Classification Search
None
See application file for complete search history.

(56) References Cited

U.S. PATENT DOCUMENTS

| | | |
|---|---|---|
| 3,416,043 A | 12/1968 | Jorgensen |
| 4,254,303 A | 3/1981 | Takizawa |
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |

(Continued)

FOREIGN PATENT DOCUMENTS

| | | |
|---|---|---|
| CN | 1981496 A | 11/1927 |
| CN | 1464685 | 12/2003 |

(Continued)

OTHER PUBLICATIONS

Krikorian, Jason, U.S. Appl. No. 11/734,277, filed Apr. 12, 2007.

(Continued)

*Primary Examiner* — Heather Jones
(74) *Attorney, Agent, or Firm* — Ingrassia Fisher & Lorenz, P.C.

(57) ABSTRACT

Systems and methods are described for searching media files using a set-top box (STB), a television receiver, digital video recorder (DVR), placeshifting device or other media device, or any type of network host that communicates with a media device of any sort. Search criteria is received from a user, and the search criteria is identified in listings of media programming available from one or more sources. In some implementations, a combined search result can be provided that identifies instances of the search criteria found in program guide listings, files stored on a digital video recorder (DVR), available on-demand content, or any other sources as desired. Some implementations may prioritize search results using information about files stored on a DVR, user preferences, or any other information as desired.

27 Claims, 4 Drawing Sheets

(56) References Cited

U.S. PATENT DOCUMENTS

Figure 1:
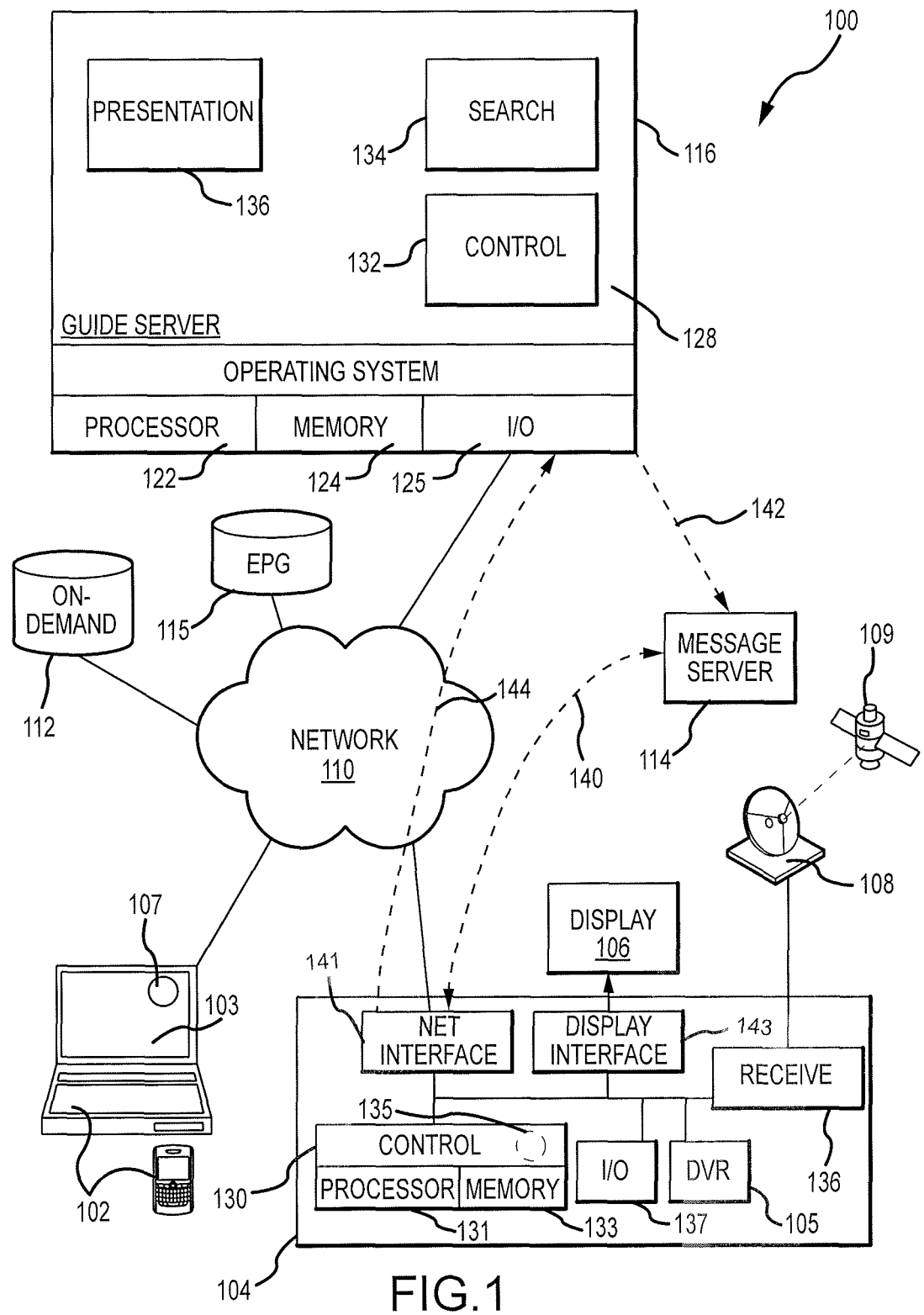

| | | |
|---|---|---|
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,310,886 B1 | 10/2001 | Barton |
| 6,340,994 B1 | 1/2002 | Margulis et al. |
| 6,353,885 B1 | 3/2002 | Herzi et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,421,429 B1 | 7/2002 | Merritt et al. |
| 6,434,113 B1 | 8/2002 | Gubbi |
| 6,442,067 B1 | 8/2002 | Chawla et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,732,158 B1 | 5/2004 | Hesselink et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Masud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,127,507 B1 | 10/2006 | Clark et al. |
| 7,137,136 B1 * | 11/2006 | Aratani ............... 725/53 |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | DaCosta |
| 7,430,686 B1 | 9/2008 | Wang et al. |
| 7,464,396 B2 | 12/2008 | Hejna, Jr. |
| 7,478,164 B1 | 1/2009 | Lango et al. |
| 7,478,166 B2 | 1/2009 | Agnoli et al. |
| 7,502,733 B2 | 3/2009 | Andrsen et al. |
| 7,505,480 B1 | 3/2009 | Zhang et al. |
| 7,516,136 B2 | 4/2009 | Lee et al. |
| 7,549,160 B1 | 6/2009 | Podar et al. |
| 7,558,862 B1 | 7/2009 | Tyukasz et al. |
| 7,565,681 B2 | 7/2009 | Ngo et al. |
| 7,594,218 B1 | 9/2009 | Lozben |
| 7,647,430 B2 | 1/2010 | Ng et al. |

(56) References Cited

U.S. PATENT DOCUMENTS

| | | |
|---|---|---|
| 7,676,590 B2 | 3/2010 | Silverman et al. |
| 7,706,358 B2 | 4/2010 | Kitada |
| 7,721,300 B2 | 5/2010 | Tipton et al. |
| 7,721,315 B2 | 5/2010 | Brown et al. |
| 7,895,275 B1 | 2/2011 | Evans et al. |
| 7,921,150 B1 | 4/2011 | Schwartz |
| 7,945,688 B1 | 5/2011 | Lango et al. |
| 7,975,047 B2 | 7/2011 | Dongre |
| 8,082,545 B2 | 12/2011 | Prakash |
| 8,171,148 B2 | 5/2012 | Lucas et al. |
| 8,194,681 B2 | 6/2012 | Kaarela et al. |
| 2001/0021998 A1 | 9/2001 | Margulis |
| 2002/0004839 A1 | 1/2002 | Wine et al. |
| 2002/0010925 A1 | 1/2002 | Kikinis |
| 2002/0012530 A1 | 1/2002 | Bruls |
| 2002/0031333 A1 | 3/2002 | Mano et al. |
| 2002/0042921 A1* | 4/2002 | Ellis ............... 725/87 |
| 2002/0046404 A1 | 4/2002 | Mizutani |
| 2002/0053053 A1 | 5/2002 | Nagai et al. |
| 2002/0080753 A1 | 6/2002 | Lee |
| 2002/0083153 A1 | 6/2002 | Sweatt, III et al. |
| 2002/0090029 A1 | 7/2002 | Kim |
| 2002/0105529 A1 | 8/2002 | Bowser et al. |
| 2002/0112247 A1 | 8/2002 | Horner et al. |
| 2002/0122137 A1 | 9/2002 | Chen et al. |
| 2002/0131497 A1 | 9/2002 | Jang |
| 2002/0138843 A1 | 9/2002 | Samaan et al. |
| 2002/0143972 A1 | 10/2002 | Christopoulos et al. |
| 2002/0143973 A1 | 10/2002 | Price |
| 2002/0147634 A1 | 10/2002 | Jacoby et al. |
| 2002/0147687 A1 | 10/2002 | Breiter et al. |
| 2002/0167458 A1 | 11/2002 | Baudisch et al. |
| 2002/0188818 A1 | 12/2002 | Nimura et al. |
| 2002/0191575 A1 | 12/2002 | Kalavade et al. |
| 2003/0001880 A1 | 1/2003 | Holtz et al. |
| 2003/0028873 A1 | 2/2003 | Lemmons |
| 2003/0065915 A1 | 4/2003 | Yu et al. |
| 2003/0074660 A1 | 4/2003 | McCormack et al. |
| 2003/0093260 A1 | 5/2003 | Dagtas et al. |
| 2003/0095791 A1 | 5/2003 | Barton et al. |
| 2003/0115167 A1 | 6/2003 | Sharif et al. |
| 2003/0159143 A1 | 8/2003 | Chan |
| 2003/0187657 A1 | 10/2003 | Erhart et al. |
| 2003/0192054 A1 | 10/2003 | Birks et al. |
| 2003/0198243 A1 | 10/2003 | Yamada |
| 2003/0208612 A1 | 11/2003 | Harris et al. |
| 2003/0231621 A1 | 12/2003 | Gubbi et al. |
| 2004/0003406 A1 | 1/2004 | Billmaier |
| 2004/0052216 A1 | 3/2004 | Roh |
| 2004/0068334 A1 | 4/2004 | Tsai et al. |
| 2004/0083301 A1 | 4/2004 | Murase et al. |
| 2004/0100486 A1 | 5/2004 | Flamini et al. |
| 2004/0103340 A1 | 5/2004 | Sundareson et al. |
| 2004/0139047 A1 | 7/2004 | Rechsteiner et al. |
| 2004/0162845 A1 | 8/2004 | Kim et al. |
| 2004/0162903 A1 | 8/2004 | Oh |
| 2004/0172410 A1 | 9/2004 | Shimojima et al. |
| 2004/0177151 A1 | 9/2004 | Kryeziu |
| 2004/0194141 A1* | 9/2004 | Sanders ............... 725/53 |
| 2004/0205830 A1 | 10/2004 | Kaneko |
| 2004/0212640 A1 | 10/2004 | Mann et al. |
| 2004/0216173 A1 | 10/2004 | Horoszowski et al. |
| 2004/0221029 A1 | 11/2004 | Jenkins et al. |
| 2004/0236844 A1 | 11/2004 | Kocherlakota |
| 2004/0255249 A1 | 12/2004 | Chang et al. |
| 2005/0021398 A1 | 1/2005 | McCleskey et al. |
| 2005/0027821 A1 | 2/2005 | Alexander et al. |
| 2005/0038981 A1 | 2/2005 | Connor et al. |
| 2005/0044058 A1 | 2/2005 | Matthews et al. |
| 2005/0050462 A1 | 3/2005 | Whittle et al. |
| 2005/0053356 A1 | 3/2005 | Mate et al. |
| 2005/0055595 A1 | 3/2005 | Frazer et al. |
| 2005/0060759 A1 | 3/2005 | Rowe et al. |
| 2005/0097542 A1 | 5/2005 | Lee |
| 2005/0114852 A1 | 5/2005 | Chen et al. |
| 2005/0132351 A1 | 6/2005 | Randall et al. |
| 2005/0138560 A1 | 6/2005 | Lee et al. |
| 2005/0155077 A1* | 7/2005 | Lawrence et al. ............ 725/109 |
| 2005/0198584 A1 | 9/2005 | Matthews et al. |
| 2005/0204046 A1 | 9/2005 | Watanabe |
| 2005/0216851 A1 | 9/2005 | Hull et al. |
| 2005/0227621 A1 | 10/2005 | Katoh |
| 2005/0229118 A1 | 10/2005 | Chiu et al. |
| 2005/0246369 A1 | 11/2005 | Oreizy et al. |
| 2005/0251833 A1 | 11/2005 | Schedivy |
| 2005/0283791 A1 | 12/2005 | McCarthy et al. |
| 2005/0288999 A1 | 12/2005 | Lerner et al. |
| 2006/0011371 A1 | 1/2006 | Fahey |
| 2006/0031381 A1 | 2/2006 | Van Luijt et al. |
| 2006/0034259 A1 | 2/2006 | Matsuda |
| 2006/0050970 A1 | 3/2006 | Gunatilake |
| 2006/0051055 A1 | 3/2006 | Ohkawa |
| 2006/0064307 A1 | 3/2006 | Pakkala |
| 2006/0095401 A1 | 5/2006 | Krikorian et al. |
| 2006/0095471 A1 | 5/2006 | Krikorian et al. |
| 2006/0095472 A1 | 5/2006 | Krikorian et al. |
| 2006/0095942 A1 | 5/2006 | Van Beek |
| 2006/0095943 A1 | 5/2006 | Demircin et al. |
| 2006/0107226 A1 | 5/2006 | Matthews et al. |
| 2006/0117371 A1 | 6/2006 | Margulis |
| 2006/0146174 A1 | 7/2006 | Hagino |
| 2006/0171395 A1 | 8/2006 | Deshpande |
| 2006/0190616 A1 | 8/2006 | Mayerhofer et al. |
| 2006/0206526 A1 | 9/2006 | Sitomer |
| 2006/0230345 A1 | 10/2006 | Weng et al. |
| 2006/0280157 A1 | 12/2006 | Karaoguz et al. |
| 2006/0280177 A1 | 12/2006 | Gupta et al. |
| 2006/0294183 A1 | 12/2006 | Agnoli et al. |
| 2007/0003224 A1 | 1/2007 | Krikorian et al. |
| 2007/0005783 A1 | 1/2007 | Saint-Hillaire et al. |
| 2007/0019545 A1 | 1/2007 | Alt et al. |
| 2007/0022328 A1 | 1/2007 | Tarra et al. |
| 2007/0043792 A1 | 2/2007 | O'Brien |
| 2007/0055728 A1 | 3/2007 | Shea et al. |
| 2007/0067390 A1 | 3/2007 | Agnoli et al. |
| 2007/0073767 A1 | 3/2007 | Springer, Jr. et al. |
| 2007/0074115 A1 | 3/2007 | Patten et al. |
| 2007/0076604 A1 | 4/2007 | Litwack |
| 2007/0107019 A1 | 5/2007 | Romano et al. |
| 2007/0136778 A1 | 6/2007 | Birger et al. |
| 2007/0147263 A1 | 6/2007 | Liao et al. |
| 2007/0154163 A1 | 7/2007 | Cordray |
| 2007/0157237 A1 | 7/2007 | Cordray et al. |
| 2007/0162502 A1 | 7/2007 | Thomas et al. |
| 2007/0168543 A1 | 7/2007 | Krikorian et al. |
| 2007/0180485 A1 | 8/2007 | Dua |
| 2007/0183436 A1 | 8/2007 | Hunter |
| 2007/0198532 A1 | 8/2007 | Krikorian et al. |
| 2007/0217407 A1 | 9/2007 | Yuan et al. |
| 2007/0234213 A1 | 10/2007 | Krikorian et al. |
| 2007/0283393 A1 | 12/2007 | Kikinis |
| 2007/0286596 A1 | 12/2007 | Lonn |
| 2007/0288550 A1 | 12/2007 | Ise et al. |
| 2008/0007651 A1 | 1/2008 | Bennett |
| 2008/0019276 A1 | 1/2008 | Takatsuji et al. |
| 2008/0037573 A1 | 2/2008 | Cohen |
| 2008/0059533 A1 | 3/2008 | Krikorian |
| 2008/0060035 A1 | 3/2008 | Tsang et al. |
| 2008/0134267 A1 | 6/2008 | Moghe et al. |
| 2008/0195698 A1 | 8/2008 | Stefanovic et al. |
| 2008/0195744 A1 | 8/2008 | Bowra et al. |
| 2008/0199150 A1 | 8/2008 | Candelore |
| 2008/0209487 A1 | 8/2008 | Osann et al. |
| 2008/0215392 A1 | 9/2008 | Rajan |
| 2008/0229404 A1 | 9/2008 | Siegrist et al. |
| 2008/0294759 A1 | 11/2008 | Biswas et al. |
| 2008/0301233 A1 | 12/2008 | Choi |
| 2008/0307456 A1 | 12/2008 | Beetcher et al. |
| 2008/0307462 A1 | 12/2008 | Beetcher et al. |
| 2008/0307463 A1 | 12/2008 | Beetcher et al. |
| 2009/0037954 A1 | 2/2009 | Nagano |
| 2009/0074380 A1 | 3/2009 | Boston et al. |
| 2009/0103607 A1 | 4/2009 | Bajpai et al. |
| 2009/0133088 A1 | 5/2009 | Kim et al. |

(56) References Cited

U.S. PATENT DOCUMENTS

| | | | |
|---|---|---|---|
| 2009/0146779 A1 | 6/2009 | Kumar et al. | |
| 2009/0157777 A1 | 6/2009 | Golwalkar et al. | |
| 2009/0164600 A1 | 6/2009 | Issa et al. | |
| 2009/0199248 A1 | 8/2009 | Ngo et al. | |
| 2009/0254672 A1 | 10/2009 | Zhang | |
| 2009/0268740 A1 | 10/2009 | Sindhu et al. | |
| 2009/0282445 A1 | 11/2009 | Yang et al. | |
| 2010/0005483 A1 | 1/2010 | Rao | |
| 2010/0023642 A1 | 1/2010 | Ladd et al. | |
| 2010/0030880 A1 | 2/2010 | Joshi et al. | |
| 2010/0034511 A1* | 2/2010 | Kawai et al. | 386/83 |
| 2010/0046513 A1 | 2/2010 | Park et al. | |
| 2010/0061708 A1 | 3/2010 | Barton | |
| 2010/0070925 A1 | 3/2010 | Einaudi et al. | |
| 2010/0077438 A1* | 3/2010 | Ansari | 725/91 |
| 2010/0100898 A1 | 4/2010 | Pfleging et al. | |
| 2010/0100915 A1 | 4/2010 | Krikorian et al. | |
| 2010/0146527 A1 | 6/2010 | Craib et al. | |
| 2010/0153885 A1 | 6/2010 | Yates | |
| 2010/0169477 A1 | 7/2010 | Stienhans et al. | |
| 2010/0175090 A1 | 7/2010 | Cordray | |
| 2010/0226444 A1 | 9/2010 | Thevathasan et al. | |
| 2010/0269144 A1 | 10/2010 | Forsman et al. | |
| 2010/0281042 A1 | 11/2010 | Windes et al. | |
| 2010/0309916 A1 | 12/2010 | Oskouy et al. | |
| 2010/0333162 A1* | 12/2010 | Lloyd et al. | 725/131 |
| 2011/0002381 A1 | 1/2011 | Yang et al. | |
| 2011/0047079 A1 | 2/2011 | Du et al. | |
| 2011/0050908 A1 | 3/2011 | Nam | |
| 2011/0125861 A1 | 5/2011 | Evans et al. | |
| 2011/0307608 A1 | 12/2011 | Chang et al. | |
| 2011/0321079 A1 | 12/2011 | Lankford | |
| 2012/0039580 A1 | 2/2012 | Sweatt, III et al. | |
| 2012/0166669 A1 | 6/2012 | Price | |
| 2012/0219001 A1 | 8/2012 | Sindhu et al. | |

FOREIGN PATENT DOCUMENTS

| | | |
|---|---|---|
| DE | 4407319 A1 | 9/1994 |
| EP | 0838945 A | 4/1998 |
| EP | 1077407 A1 | 2/2001 |
| EP | 1255395 A2 | 11/2002 |
| EP | 1443766 A2 | 8/2004 |
| EP | 1691550 A | 8/2006 |
| EP | 1830558 A1 | 9/2007 |
| EP | 2071839 A1 | 6/2009 |
| GB | 2307151 A | 5/1997 |
| JP | 2001211416 A | 8/2001 |
| JP | 2001345766 A | 12/2001 |
| JP | 2003046582 A | 2/2003 |
| JP | 2003304231 A | 10/2003 |
| JP | 2004015111 A | 1/2004 |
| JP | 2005229152 A | 8/2005 |
| JP | 200654535 A | 2/2006 |
| JP | 2006295909 | 10/2006 |
| JP | 2007181123 A | 7/2007 |
| JP | 2008172621 A | 7/2008 |
| JP | 2009009582 | 1/2009 |
| JP | 2009077212 A | 4/2009 |
| JP | 2009118032 A | 5/2009 |
| KR | 19990082855 A | 11/1999 |
| KR | 20010211410 A | 8/2001 |
| WO | 0133839 A1 | 5/2001 |
| WO | 0147248 A2 | 6/2001 |
| WO | 0193161 A1 | 12/2001 |
| WO | 03026232 A1 | 3/2003 |
| WO | 03052552 A2 | 6/2003 |
| WO | 03098897 A | 11/2003 |
| WO | 2004032511 A1 | 4/2004 |
| WO | 2005050898 A2 | 6/2005 |
| WO | 2006064454 A1 | 6/2006 |
| WO | 20060074110 A | 7/2006 |
| WO | 2007027891 A2 | 3/2007 |
| WO | 2007051156 A2 | 5/2007 |
| WO | 2007096001 A1 | 8/2007 |
| WO | 2007141555 A2 | 12/2007 |
| WO | 2007149466 A2 | 12/2007 |
| WO | 2008024723 A | 2/2008 |
| WO | 2009073828 A1 | 6/2009 |
| WO | 2009073830 A1 | 6/2009 |
| WO | 2009134073 A2 | 11/2009 |

OTHER PUBLICATIONS

Tarra, Raghuveer et al., U.S. Appl. No. 60/975,239, filed Sep. 26, 2007.

Williams, George Edward, U.S. Appl. No. 12/167,041, filed Jul. 2, 2008.

Rao, Padmanabha R., U.S. Appl. No. 12/166,039, filed Jul. 1, 2008.

International Search Report and Written Opinion, PCT/US2005/020105, Feb. 15, 2007, 6 pages.

International Search Report and Written Opinion for PCT/US2006/04382, mailed Apr. 27, 2007.

Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.

Faucon, B. "TV 'Brick' Opens up Copyright Can of Worms," Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01 &pagetype+printer§ion+1053801318705&path+articles/2003/06/30/0156825330084.html.].

Balster, Eric J., "Video Compression and Rate Control Methods Based on the Wavelet Transform," The Ohio State University 2004, pp. 1-24.

Kulapala et al., "Comparison of Traffic and Quality Characteristics of Rate-Controlled Wavelet and DCT Video," Arizona State University, Oct. 11, 2004.

Skodras et al., "JPEG2000: The Upcoming Still Image Compression Standard," May 11, 2000, 14 pages.

Taubman et al., "Embedded Block Coding in JPEG2000," Feb. 23, 2001, pp. 1-8 of 36.

Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.

Roe, Kevin, "Third-Party Observation Under EPC Article 115 on the Patentability of an Invention," Dec. 21, 2007.

Roe, Kevin, Third-Party Submission for Published Application Under CFR §1.99, Mar. 26, 2008.

Bajpai, Parimal et al. "Systems and Methods of Controlling the Encoding of a Media Stream," U.S. Appl. No. 12/339,878, filed Dec. 19, 2008.

Malone, Edward D. et al. "Systems and Methods for Controlling Media Devices," U.S. Appl. No. 12/256,344, filed Oct. 22, 2008.

Banger, Shashidhar et al. "Systems and Methods for Determining Attributes of Media Items Accessed via a Personal Media Broadcaster," U.S. Appl. No. 12/334,959, filed Dec. 15, 2008.

Kulkarni, Anant Madhava "Systems and Methods for Creating Logical Media Streams for Media Storage and Playback," U.S. Appl. No. 12/323,907, filed Nov. 26, 2008.

Rao, Padmanabha R. "Systems and Methods for Linking Media Content," U.S. Appl. No. 12/359,784, filed Jan. 26, 2009.

Krikorian, Blake Gary et al. "Systems and Methods for Presenting Media Content Obtained From Multiple Sources," U.S. Appl. No. 12/408,456, filed Mar. 20, 2009.

Krikorian, Blake Gary et al. "Systems and Methods for Projecting Images From a Computer System," U.S. Appl. No. 12/408,460, filed Mar. 20, 2009.

International Search Report and Written Opinion for International Application No. PCT/US2006/025911, mailed Jan. 3, 2007.

International Search Report for International Application No. PCT/US2007/063599, mailed Dec. 12, 2007.

International Search Report for International Application No. PCT/US2007/076337, mailed Oct. 20, 2008.

(56) References Cited

OTHER PUBLICATIONS

International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL:http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009.
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
China State Intellectual Property Office First Office Action, issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Einaudi, Andrew E. et al. "Systems and Methods for Selecting Media Content Obtained from Multiple Sources," U.S. App. No. 12/543,278, filed Aug. 18, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Nandury, Venkata Kishore "Adaptive Gain Control for Digital Audio Samples in a Media Stream," U.S. Appl. No. 12/507,971, filed Jul. 23, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.
Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Conway, Frank et al. "Systems and Methods for Creating Variable Length Clips from a Media Stream," U.S. Appl. No. 12/347,465, filed Dec. 31, 2008.
Lucas, Brian et al. "Systems and Methods for Establishing Connections Between Devices Communicating Over a Network," U.S. Appl. No. 12/426,103, filed Apr. 17, 2009.
USPTO, Final Office Action, mailed Nov. 6, 2009; U.S. Appl. No. 09/809,868, filed Mar. 15, 2001.
Thiyagarajan, Venkatesan et al. "Always-On-Top Media Player Launched From a Web Browser," U.S. Appl. No. 12/617,271, filed Nov. 12, 2009.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO, Final Office Action mailed Nov. 12, 2009; U.S. Appl. No. 11/620,707, filed Jan. 7, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server via a Network," U.S. Appl. No. 12/645,870, filed Dec. 23, 2009.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.

(56) References Cited

OTHER PUBLICATIONS

Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Srisuresh, P. et al. "Traditional IP Network Address Translator (Traditional NAT)," Network Working Group, The Internet Society, Jan. 2001.
Gangotri, Arun L. et al. "Systems, Methods, and Program Applications for Selectively Restricting the Placeshifting of Copy Protected Digital Media Content," U.S. Appl. No. 12/623,955, filed Nov. 23, 2009.
Australian Government Office Action, Australian Patent Application No. 2006240518, mailed Nov. 12, 2009.
European Patent Office, European Search Report for European Application No. EP 08 16 7880, mailed Mar. 4, 2009.
MythTV Wiki, "MythTV User Manual" [Online], Aug. 27, 2007, XP002515046; retrieved from the Internet: <URL:http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth—News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
European Patent Office, International Searching Authority, International Search Report, mailed Dec. 13, 2010; International Application No. PCT/US2010/029062 filed Mar. 29, 2010.
USPTO Notice of Allowance mailed Jan. 10, 2012; U.S. Appl. No. 12/426,103, filed Apr. 17, 2009.
China State Intellectual Property Office First Office Action, issued Jan. 8, 2010, for Application No. 200810126554.0.
USPTO Final Office action mailed Jan. 25, 2010; U.S. Appl. No. 11/734,277, filed Apr. 12, 2007.
Gurzhi, Alexander et al. "Systems and Methods for Emulation Network-Enabled Media Components," U.S. Appl. No. 12/711,830, filed Feb. 24, 2010.
Jain, Vikal Kumar "Systems and Methods for Coordinating Data Communication Between Two Device," U.S. Appl. No. 12/699,280, filed Feb. 3, 2010.
"The Authoritative Dictionary of IEEE Standard Terms," 7th ed. 2000.
Newton's Telcom Dictionary, 20th ed., Mar. 2004.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
European Patent Office, International Searching Authority, International Search Report, mailed Mar. 30, 2010; International Application PCT/US2009/068468 filed Dec. 27, 2009.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
USPTO Non-Final Office Action mailed Mar. 21, 2011; U.S. Appl. No. 12/426,103, filed Apr. 17, 2009.
European Patent Office, International Searching Authority, International Search Report mailed Mar. 18, 2011; International Appln. No. PCT/US2010/060797, filed Dec. 16, 2010.
China State Intellectual Property Office Office Action issued Mar. 18, 2010 for Application No. 200680022520.6.

(56) References Cited

OTHER PUBLICATIONS

China State Intellectual Property Office Office Action issued Apr. 13, 2010 for Application No. 200580026825.X.
Canadian Intellectual Property Office Office Action mailed Feb. 18, 2010 for Application No. 2569610.
European Patent Office European Search Report, mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
USPTO Non-Final Office Action mailed Apr. 27, 2012; U.S. Appl. No. 12/821,983, filed Jun. 23, 2010.
Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1, Nov. 27, 2000, pp. 293-297, XP001195580; ISBN: 978-0-7803-6452-3, lines 15-20 of sec. II on p. 293, fig. 1.
European Patent Office, International Searching Authority, International Search Report and Written Opinion, mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office Official Notice of Preliminary Rejection, issued Jun. 18, 2010; Korean Patent Application No. 10-2008-7021254.
Japan Patent Office Notice of Grounds for Rejection (Office Action), mailed May 25, 2010; Patent Application No. 2007-0268269.
USPTO Non-Final Office Action mailed Jun. 27, 2012 for U.S. Appl. No. 13/458,852, filed Apr. 27, 2012.
USPTO Final Office Action mailed Aug. 7, 2012 for U.S. Appl. No. 12/821,983, filed Jun. 23, 2010.
USPTO Non-Final Office Action mailed Jul. 19, 2012 for U.S. Appl. No. 12/619,192, filed Nov. 16, 2009.
USPTO Final Office Action mailed Oct. 17, 2011; U.S. Appl. No. 12/426,103, filed Apr. 17, 2009.
European Patent Office, International Searching Authority, International Search Report mailed Nov. 16, 2011; International Patent Appln. No. PCT/US2011/039937, filed Jun. 10, 2011.
USPTO Non-Final Office Action mailed Feb. 25, 2013 for U.S. Appl. No. 13/458,852.
USPTO Non-Final Office Action mailed Sep. 14, 2012 for U.S. Appl. No. 12/635,138, filed Dec. 10, 2009.
USPTO Non-Final Office Action mailed Feb. 5, 2013 for U.S. Appl. No. 13/098,192, filed Apr. 29, 2011.
USPTO Non-Final Office Action mailed Oct. 12, 2012 for U.S. Appl. No. 12/645,870, filed Dec. 23, 2009.
Intellectual Property Office of Singapore Search Report and Written Opinion dated Nov. 8, 2012 for Singapore Appln. No. 201107539-7.
USPTO Final Office Action mailed Feb. 21, 2013 for U.S. Appl. No. 12/619,192, filed Nov. 16, 2009.
Japan Patent Office Notice of Rejection Ground dated Mar. 26, 2013 for Japanese Patent Appln. No. 2012-506055.
Australian Government Patent Examination Report No. 1 dated Apr. 5, 2013 for Australian Patent Appln. No. 2010236888.
Canadian Intellectual Property Office, Office Action mailed May 17, 2013 for Canadian Patent Application No. 2,758,791.
Intellectual Property Office of Singapore, Search Report and Written Opinion, mailed May 30, 2013 for Singapore Patent Application No. 201204603-3.
Intellectual Property Office, Office Action mailed Apr. 26, 2013 for Taiwan Patent Application No. 099111307.
Intellectual Property Office Office Action issued May 20, 2013 for Taiwan Patent Appln. No. 099144605.
USPTO Notice of Allowance mailed Jun. 24, 2013 for U.S. Appl. No. 12/635,138.
Intellectual Property Office of Singapore, Search and Examination Report, dated Aug. 30, 2013 for Singapore Application No. 201107539-7.
Australian Government, Patent Examination Report No. 1 for Australian Patent Application No. 2011271358, mailed Nov. 15, 2013.
Japan Patent Office, Notice of Rejection Grounds, dated Dec. 3, 2013 for Japanese Patent Application No. 2012-506055.
China State Intellectual Property Office, First Office Action mailed Nov. 8, 2013 for China Patent Application No. 201080016835.6.
Intellectual Property Office, Decision of the Intellectual Property Office mailed Dec. 30, 2013 for Taiwan Patent Application No. 099144605.
Japan Patent Office, Notice of Rejection Grounds mailed Jan. 21, 2014 for Japanese Patent Application No. 2013-516600.
Hungarian Intellectual Property Office as Examiner According to the Memorandum of Understanding Between Intellectual Property Office of Singapore and the Hungarian Intellectual Property Office, Examination Report mailed Jan. 16, 2014 for Singapore Patent Application No. 201204603-3.
Canadian Intellectual Property Office, Notice of Allowance, dated Jun. 30, 2014 for Canadian Patent Application No. 2,758,791.
Australian Government, Notice of Acceptance, dated Jul. 16, 2014 for Australian Patent Application No. 2010236888.
USPTO, Final Office Action mailed Aug. 1, 2013 for U.S. Appl. No. 12/645,870.
USPTO, Notice of Allowance mailed Sep. 27, 2013 for U.S. Appl. No. 13/098,192.
Japan Patent Office, Notice of Rejection Ground mailed Oct. 29, 2013 for Japanese Patent Application No. 2012-546061.
US Patent and Trademark Office, Final Office Action, dated Nov. 18, 2013 for U.S. Appl. No. 13/458,852.
Canadian Intellectual Property Office, Official Action, mailed Jan. 23, 2014 for Canadian Patent Application No. 2,803,796.
Japan Patent Office, Decision of Rejection mailed Jun. 3, 2014 for Japanese Patent Application No. 2012-506055.
Japan Patent Office, Decision of Dismissal of Amendment mailed Jun. 3, 2014 for Japanese Patent Application No. 2012-506055.
Korean Intellectual Property Office, Notice of Allowance mailed Jun. 9, 2014 for Korean Patent Application No. 10-2013-7001665.
USPTO, Non-Final Office Action mailed Jun. 19, 2014 for U.S. Appl. No. 12/821,983.
U.S. Patent and Trademark Office, Non-Final Office Action, mailed Mar. 27, 2014 for U.S. Appl. No. 12/645,870.
U.S. Patent and Trademark Office, Notice of Allowance, mailed May 9, 2014 for U.S. Appl. No. 13/458,852.
Australian Government, Notice of Acceptance, dated May 29, 2014 for Australian Patent Application No. 2011271358.
China State Intellectual Property Office, Office Action, dated Aug. 27, 2014 for China Patent Application No. 201080016835.6.
Japan Patent Office, Decision to Grant, dated Nov. 25, 2014 for Japanese Patent Application No. 2013-516600.
U.S. Patent and Trademark Office, Notice of Allowance, dated Dec. 5, 2014 for U.S. Appl. No. 12/619,192.
U.S. Patent and Trademark Office, Final Office Action, dated Dec. 17, 2014 for U.S. Appl. No. 12/645,870.
U.S. Patent and Trademark Office, Final Office Action, dated Dec. 15, 2014 for U.S. Appl. No. 12/821,983.
USPTO, U.S. Appl. No. 13/098,192, filed Apr. 29, 2011.
Israel Patent Office, Official Action for Israel Patent Application No. 220481 mailed May 31, 2015.
The International Bureau of WIPO, International Preliminary Report on Patentability for International Application No. PCT/US2010/060797 mailed Jun. 26, 2012.

(56) References Cited

OTHER PUBLICATIONS

Intellectual Property Office, Office Action for ROC (Taiwan) Patent Application No. 099144605 mailed May 20, 2015.
USPTO, Final Office Action for U.S. Appl. No. 14/142,375 mailed Jun. 18, 2015.
IP Australia, Notice of Acceptance for Australian Patent Application No. 2010333843 mailed Jul. 2, 2015.
USPTO, Notice of Allowance and Fee(s) Due for U.S. Appl. No. 12/645,870 mailed Jul. 7, 2015.
State Intellectual Property Office of the People's Republic of China, Office Action for PRC (China) Patent Application No. 201180030790.2 mailed Feb. 27, 2015.
USPTO, Office Action for U.S. Appl. No. 14/486,908 mailed Mar. 27, 2015.
USPTO, Notice of Allowance and Fee(s) Due for U.S. Appl. No. 12/821,983 mailed Mar. 23, 2015.

* cited by examiner

SYSTEMS AND METHODS FOR SEARCHING MEDIA CONTENT

TECHNICAL FIELD

The present disclosure generally relates to systems and methods for searching lists of media content.

BACKGROUND

Media content can now be received from any number of different sources. Broadcast television content, for example, can typically be received at set-top box (STB) or other receiver that receives a direct broadcast satellite (DBS), cable and/or terrestrial broadcast signal. Received content may be stored in a personal or digital video recorder (DVR) or the like for viewing at a later time ("time shifting"). Frequently, live or pre-recorded content can also be "placeshifted" over the Internet or another network to allow viewing at remote locations away from the viewer's primary television set. In addition to the wide variety of options in viewing broadcast media content, even more content is increasingly becoming available "on demand" from any number of file based or streaming sources, including various network-based services that provide access to a wealth of on-demand programming.

As content becomes available from a multitude of sources, however, it can be increasingly difficult to locate desired programming. If a viewer wishes to locate a particular program or episode, for example, he or she would typically conduct separate searches of broadcast program guides, on-demand libraries, DVR contents and/or the like to try and find the desired program. Moreover, the wealth of content available often makes broad searches impractical. That is, conventional searches for broad categories of programming (e.g., "comedy") can be impractical, since the number of results returned from such searches often far exceeds the number of results that can be readily processed by the viewer.

As a result, it is now desirable to create systems and methods for improved searching of media content. Other desirable features and characteristics may also become apparent from the subsequent detailed description and the appended claims, taken in conjunction with the accompanying drawings and this background section.

BRIEF SUMMARY

According to various exemplary embodiments, systems and/or methods for searching media content are provided. In some implementations, the user is able to provide search criteria (e.g., a program name, program genre, or the like) to a search engine executing at set-top box, digital video recorder or other media device, or at a network host communicating with the media device, to identify instances of the search criteria available from multiple programming sources. For example, a search of a particular program name may identify instances of the program available from an electronic guide of upcoming broadcasts, from programs stored on the user's digital video recorder, and/or from available on-demand content. In such embodiments, a combined search result can be provided that allows the viewer to identify the desired programming that can be obtained from any number of different sources. Various embodiments may additionally or alternately prioritize the search results obtained from one or more sources using content obtained from the user's digital video recorder and/or using any other information as desired.

Some embodiments provide a method executable by a set-top box, television receiver, placeshifting device, digital video recorder, network guide server and/or other data processing system to identify desired media programming. The method suitably comprises receiving, by the data processing system, search criteria provided by a user that indicates the desired media programming, searching, by the data processing system, for the search criteria in both of a first listing of media programming available from a first source and in a second listing of media programming available from a second source that is different from the first source, and providing a search result from the data processing system that identifies instances of the search criteria found in both the first and the second listings of media programming.

Other embodiments provide a network guide server or other system that communicates via a network with a client and with a media server having stored programming content. The system suitably comprises a message server configured to communicate with the media server via the network using a pre-existing connection, and a guide server configured to receive a request from the client via the network, to direct the message server to contact the media server in response to the request, to establish a session via the network with the media server, to receive information about the media content stored at the media server via the session, to receive search criteria from the client, to search for the search criteria in both program guide information associated with the media server and in the information about the media content stored at the media server, and to provide a search result to the client that identifies instances of the search criteria found in both the program guide information and in the media content stored at the media server.

Still other embodiments provide a set-top box, television receiver, placeshifting device and/or other system. The system suitably comprises a receiver, a digital video recorder configured to store a plurality of programs, and a controller. The receiver is configured to receive television programming and an electronic program guide, wherein the electronic program guide describes the television programming that is available to be received using the receiver. The controller is configured to receive search criteria from a user, to search for the search criteria in both the electronic program guide and in the plurality of programs stored on the digital video recorder, and to provide a combined search result to the user that identifies instances of the search criteria found in both the electronic program guide and in the plurality of programs stored on the digital video recorder.

Still other embodiments provide a method executable by a set-top box, television receiver, placeshifting device, digital video recorder, network guide server and/or other data processing system to prioritize search results. The method suitably comprises obtaining search results that identify a plurality of programs, determining a score for each of the plurality of programs based at least in part upon whether the program is associated with the content recorded by the digital video recorder, and ranking the plurality of programs according to the score determined for each program.

Various other embodiments, aspects and features are described in more detail below.

BRIEF DESCRIPTION OF THE DRAWING FIGURES

Figure 2:
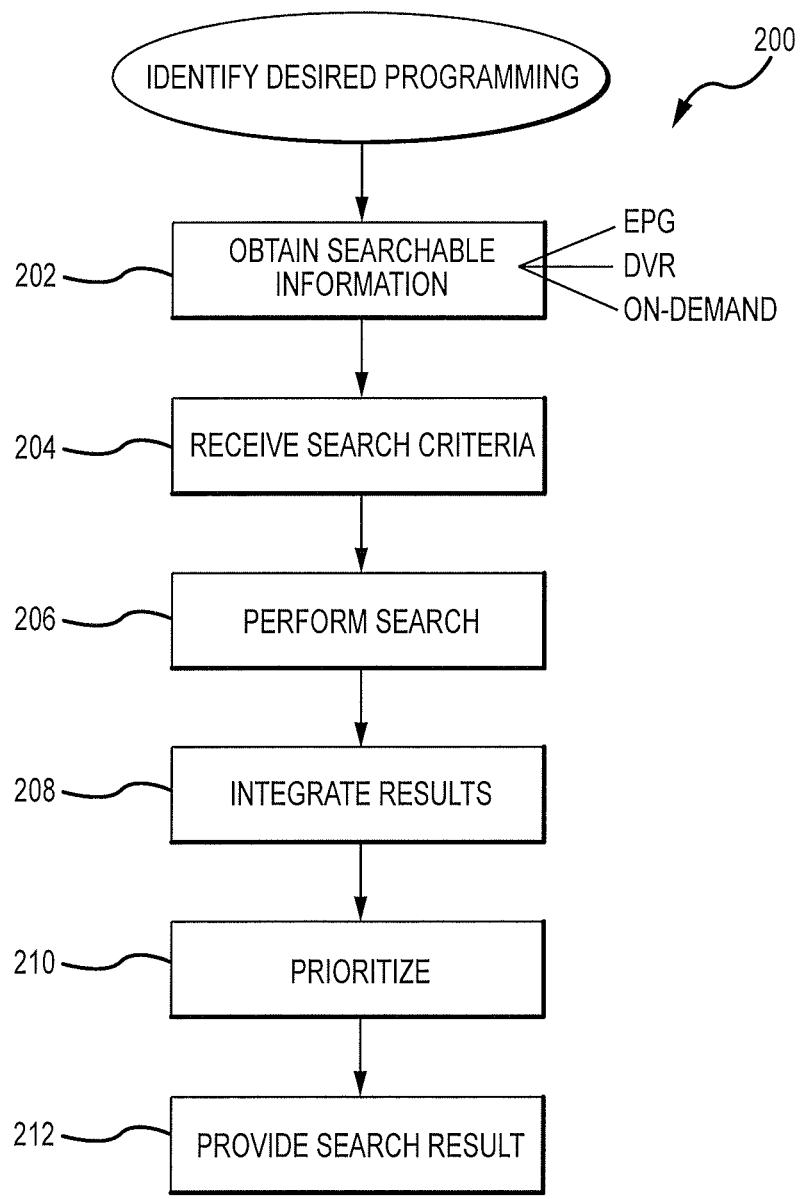
Figure 3:
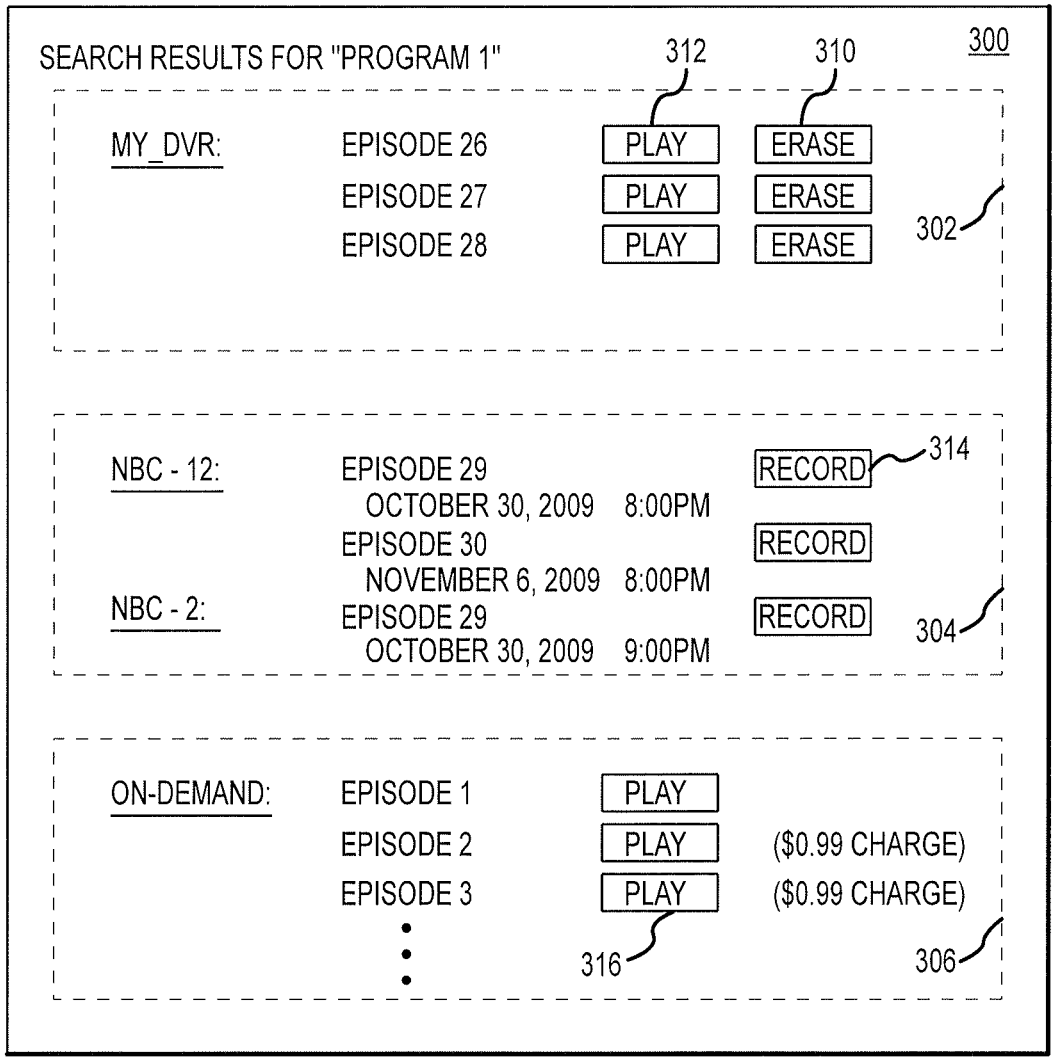
Figure 4:
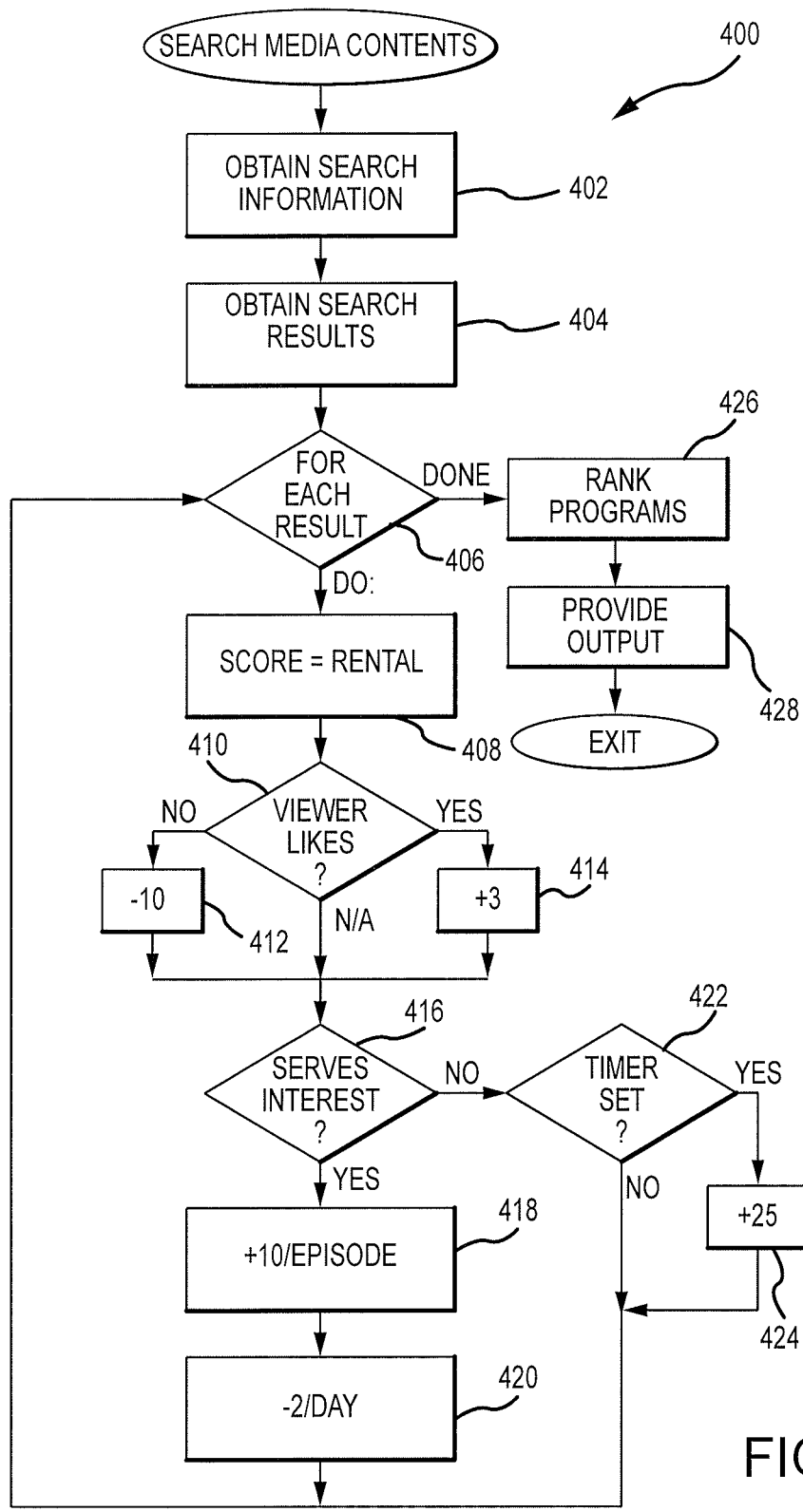

Exemplary embodiments will hereinafter be described in conjunction with the following drawing figures, wherein like numerals denote like elements, and FIG. 1 is a block diagram of an exemplary system;

FIG. 2. is a flowchart showing an exemplary process for identifying desired programming from multiple sources;

FIG. 3 shows an exemplary interface with guide data, a search feature and a media player; and FIG. 4 is a flowchart of an exemplary search technique that could be used to prioritize certain search results.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Searching for media programming may consider real-time information about programs stored on the user's DVR, STB or other media server, as well as electronic program guide information, information about on-demand programming, information obtained from another DVR or other storage device, and/or any other information as desired. Searching may additionally or alternately use information about recorded programs (e.g., programs recorded on a DVR) as well as other information to prioritize search results so that the programs most likely to appeal to the viewer are given higher priority when the results are presented to the user. Although some embodiments provide local searching on a STB or similar media device, other embodiments provide searching though an online guide server or other host that communicates in real time with the media device. The various techniques and processes described below, then, may be equivalently performed on any sort of media device, or on any sort of networked server or other host that communicates with a remotely-located media device over a network.

Turning now to the drawing figures, FIG. 1 shows an exemplary system 100 that shows both local and remote processing of search functions, even though both local and remote processing may not be present in all implementations. In various embodiments, searching is carried out locally by a media device 104 that has access to content that is stored locally in a digital video recorder 105. Media device 104 may also receive programming content via a satellite, cable or broadcast connection 108, and/or may receive on-demand or other streaming content from a server or other source 112. In such embodiments, network device 104 suitably executes a search feature 135 that is able to receive search criteria from a user, to search information about programming available from various local and/or remotely-located sources, and to provide a combined search result to the user on a display 106 or the like.

In other embodiments, media device 104 additionally or alternately interacts with a remotely-located guide server 116 that obtains information about programming stored at media device 104 and that is able to search for user-provided search criteria in program guide data, data about the programs stored with media device 104, on-demand data and/or the like. In such embodiments, the guide server 116 may be able to provide search results to a web browser 103, media player and/or other program executing on a personal computer, mobile telephone, network enabled display, network-enabled remote control or any other client 102.

Both local and remote processing of search features are described below. Some implementations may provide robust searching of content stored in DVR 105, as well as program guide information 115, information 112 about on-demand programming, and/or other information as desired in addition to information obtained from media device 104. Again, both local and remote processing need not be present in all embodiments.

As noted above, some embodiments may provide local searching of media programming at media device 104. This searching may consider, for example, program guide data stored at the media device 104, files stored on a DVR feature or the like at media device 104, and/or any other content that may be available to media device 104 via network 110 or any sort of receiver 136, as appropriate.

To that end, media device 104 is any component, hardware and/or the like capable of receiving and processing media content. In some embodiments, media device 104 is a set-top box (STB) or similar system that is able to receive television programming and/or to record certain programs that can be viewed on a display 106. Some embodiments of media device 104 will therefore include a receiver interface 136 for receiving satellite, cable and/or broadcast programming signals, as well as a personal or other digital video recorder (DVR) 105 feature, a display interface 143 for providing imagery to display 106, and a controller 130 that directs the operations of the device 104 as appropriate. Media device 104 may also include an interface 141 to network no and/or an input/output interface 137 to a remote control or other device for providing user inputs to media device 104, as appropriate. The components in media device 104 may be provided within a common chassis or housing as shown in FIG. 1, although equivalent embodiments may implement media device 104 with any number of inter-connected but discrete components or systems. Note that different embodiments, including embodiments that rely upon remote processing of search queries, may include entirely different hardware or software features. To that end, other embodiments may implement media device 104 as a digital video recorder, placeshifting device, game playing console, media player and/or the like.

Media device 104 may be logically and physically implemented in any manner. FIG. 1 shows various logical and functional features that may be present in an exemplary media device 104; each module shown in the figure may be implemented with any sort of hardware, software, firmware and/or the like. In the exemplary embodiment illustrated in FIG. 1, media device 104 is shown receiving digital broadcast satellite (DBS) signals transmitted from a satellite 109 to an antenna 108 that are received by a receiver 136. Equivalent embodiments, however, could receive programming at receiver 136 from any sort of cable connection, broadcast source, removable media, network service, external device and/or the like. Some embodiments may also include a digital video recorder (DVR) 105 feature that stores recorded programming on a hard disk drive, memory, or other storage medium as appropriate. Programming received via receiver 136, for example, may be stored in DVR 105 in response to user/viewer programming instructions for subsequent viewing on a television or other display 106 located in relatively close proximity to the media device 104.

Controller 130 is any sort of hardware, software and/or firmware capable of directing the operations of media device 104. In various embodiments, controller 130 includes software or firmware logic residing in memory 133 and executing on any sort of processor 131, such as any sort of microprocessor, microcontroller, digital signal processor or the like. In various embodiments, media device 104 is based upon a "system on chip" (SoC) implementation that incorporates a hybrid microcontroller with memory, input/output and other features to perform the various signal processing and other actions of media device 104. Different types of SoC and other integrated hardware implementations are available from Texas Instruments, Conexant Systems, Broadcom Inc., and many other suppliers as appropriate. Other embodiments may implement controller 130 and/or the other features of media device 104 with any number of discrete and/or integrated processing components (e.g., any sort of microprocessor or microcontroller), memories, input/output features and/or other features as desired.

Content stored in DVR 105 may be any sort of file-based programming or other content that is accessible to media device 104. In various embodiments, DVR 105 stores programming that is received from an internal or external television receiver, such as receiver 136. DVR 105 may also store programming received from a camera, network server and/or other source, as desired. Content may be stored in any media, including in memory, on a hard disk, on a networked server, and/or in any other digital, optical or other available storage medium. Content in DVR 105 may be stored in any sort of compressed or uncompressed format, as desired, and may be encoded or transcoded as desired for effective receipt, storage, retrieval and playing.

In various embodiments, controller 130 executes a search program 135 that allows local searching of program guide content, content stored in DVR 105, on-demand content available via network 110 or receiver 136, and/or any other information as desired. Search program 135 may additionally or alternately prioritize search results in any manner. The various searching processes described below in conjunction with FIGS. 2 and 4, for example, may be individually or jointly performed by a search program 135 executing on controller 130 in some embodiments.

In various embodiments, search program 135 is able to obtain search criteria provided by the user and to identify instances of programming meeting the search criteria that are available from any number of different sources. Search program 135 may locate particular programs, for example, that are stored on DVR 105 as well as programs that are identified in electronic program guide (EPG) data relating to broadcast content receivable via receiver 136. Many different types of media device 104 are able to receive EPG data via receiver 136 and/or network 110. This information may be readily searched at the media device 104, and search results can be combined with search results from DVR contents, on-demand sources and/or the like. In an exemplary STB implementation, for example, a user may search for a particular program, and search program 135 may be able to locate the particular program in content stored on DVR 105 and in current or upcoming broadcasts receivable by receiver 136, as well as in on-demand programming that could be received via network 110 or via receiver 136. Additional details about various searching techniques and processes are provided below.

Like the local processing described above, various remote processing embodiments allow programming from various sources to be simultaneously searched so that a combined result can be returned to the user. Such searching may be performed by a guide server or similar host 116 that obtains information about programming stored at a media device 104, and that combines information about the stored programming with information obtained from other sources (e.g., EPG information 115, information about on-demand programming 112, and/or the like). Guide server host 116 may be, for example, a server that is accessible via a network no to provide convenient access for any number of clients 102.

In various embodiments, the user is able to connect to the guide server host 116 using any appropriate client 102. The user may login or otherwise be authenticated by the host 116. Upon successful authentication, host 116 suitably establishes a connection 144 to a media device 104 that is associated with the user. This connection 144 can be used to obtain information about programming stored at device 104, or for any other purpose as described more fully below.

Client 102 may be any device, component, module, hardware, software application and/or the like that is capable of communicating over network 110. To that end, many different types of clients 102 may be implemented with any sort of general or special purpose hardware, software and/or firmware. In some embodiments, client 102 may be a conventional personal computer, portable computer, workstation and/or other computing system. In still other embodiments, some types of clients 102 may include personal digital assistants, video game players, mobile telephones, network appliances, remote controls, networked displays and/or any other devices capable of communicating on network 110.

In the embodiment shown in FIG. 1, client 102 executes any sort of conventional browser or other application 103 that is compatible with standard Internet, world wide web (WWW) and/or other formats. Conventional web browsers available for a number of different computing platforms include the INTERNET EXPLORER, MOZILLA FIREFOX, SAFARI, CHROME, and OPERA browsers, as well as many others. Such browsers 103 are typically capable of displaying active or other documents formatted in accordance with published protocols (e.g., hypertext markup language (HTML), extensible markup language (XML), and/or the like). Many browsers 103 are also capable of executing "plugin" applications, applets or the like. Such plugins may be formatted in accordance with ActiveX, JAVA and/or any number of other formats.

In some embodiments, client 102 further includes a media player application 107. This media player 107 may be a standalone player, or the media player 107 may be implemented as a plugin or other applet that runs within browser 103 as desired. In some embodiments, media player 107 is initially obtained from a networked host, such as host 116. The player may be retrieved on an as-needed basis in some embodiments, or may be stored at client 102 for subsequent execution. Some embodiments may not provide media viewing directly on client 102; such clients 102 may nevertheless be able to interact with host 116 to search for particular programming, to select programs to record, to change preferences, or to take other actions related to media device 104 as desired.

Network 110 is any digital or other communications network capable of transmitting messages between senders (e.g., media device 104) and receivers (e.g., media device 104). In various embodiments, network 110 includes any number of public or private data connections, links or networks supporting any number of communications protocols. Network 110 may include the Internet, for example, or any other network. Such networks may be based upon TCP/IP or other conventional protocols, although other embodiments may use any type of alternate or successor protocols, as desired. In various embodiments, network 110 may also incorporate a wireless and/or wired telephone network, such as a cellular communications network for communicating with mobile phones, personal digital assistants, and/or the like. Various embodiments of network 110 may also incorporate any sort of wireless or wired local area networks, such as one or more IEEE 802.3 and/or IEEE 802.11 networks.

Remote processing may operate in conjunction with any sort of media device 104 as desired. In various embodiments, media device 104 may be any device or system communicating on network 110 that is capable of receiving, recording, placeshifting and/or otherwise processing media content. As noted above, various embodiments of media device 104 include a personal or digital video recorder (DVR) feature

105 that allows the media device 104 to record received programming for later viewing. A DVR may be a standalone device, or may be integrated within any sort of receiver (e.g., a cable, direct broadcast satellite (DBS) or other set top box (STB)) that is capable of receiving and demodulating programming signals. Other embodiments of media device 104 suitable for remote processing may include any sort of standalone or hybrid media players, file servers and/or the like that are capable of receiving, storing or otherwise processing streaming or file-based content of any sort. Still other embodiments of media device 104 could implement a networked gaming server or other media service as desired.

Some embodiments of system 100 may simply use host 116 to provide searching of media programming available from one or more sources. Other embodiments, however, may allow for streaming or other playing of media content 105 from media device 104 to client 102. To that end, various embodiments of media device 104 may incorporate placeshifting functionality to support viewing of content 105 over network 110 (e.g., by client 102). In some embodiments, media device 104 includes a separate placeshifting device that works in conjunction with a STB, receiver, DVR, media player or other device to shift the viewing experience from a home television to a viewing display that is accessed via network 110. Examples of placeshifting devices that may be used in some embodiments of media device 104 could include any of the various SLINGBOX products available from Sling Media of Foster City, Calif., although other products or servers could be used in other embodiments. Many different types of placeshifting devices are generally capable of receiving media content from an external source, such as any sort of DVR or STB, cable or satellite programming source, DVD player, and/or the like. In other embodiments, placeshifting features are incorporated within the same device that provides content-receiving or other capabilities. Media device 104 may be a hybrid DVR and/or receiver, for example, that also provides transcoding and placeshifting features. Examples of conventional placeshifting functions, features, systems and structures are described in United States Patent Publication No. 2006/0095471, although the features described herein could be equivalently applied with any number of other techniques and structures in addition to those described in that particular publication.

Host 116 is any server or other network host capable of interacting with one or more clients 102 to provide instructions to one or more media devices 104. In various embodiments, host 116 is a program guide server that also allows integration of program guide information 115 and/or information about available on-demand programming 112 or the like with information about content 105, as described more fully below.

FIG. 1 shows one example of a host 116 that could be used to provide a guide server that interacts with any number of clients 102 and media devices 104. To that end, each host 116 within system 100 may be implemented with a server computer system or service that is based upon any processor, architecture and/or operating system. Each host 116 will typically by implemented using any sort of conventional processing hardware 122, memory 124 and input/output features 125. Various embodiments may be implemented using dedicated or shared hardware servers; other implementations may make use of virtual server features as part of a "cloud computing" service, such as any of the cloud computing services provided by AMAZON, GOOGLE, MICROSOFT, IBM, UBUNTU, SUN MICROSYSTEMS and/or any number of other providers.

Although FIG. 1 shows a single host 116 for convenience, many practical embodiments may provide a cluster or other collection of multiple hosts 116 to support any desired number of simultaneous connections. This cluster may also incorporate appropriate routing, load balancing, access and security mechanisms and or any number of other features. In various embodiments, each host 116 is an actual or virtual computer system executing an operating system 126 such as any version of LINUX, UNIX, SOLARIS, NETWARE, WINDOWS, OS/X, AIX and/or the like. The various UNIX/LINUX operating systems typically provide a computing core that is capable of executing a guide server application 128, as well as any number of daemons, processes, applications or other instance modules as desired. For example, a guide server application 128 could execute as a daemon on host 116, with connections to separate clients 102 being managed as separate processes or instances that communicate with server application 128 using features provided by operating system 126.

Guide server application 128 is typically initiated when host 116 is booted or otherwise initialized. In various embodiments, application 128 suitably registers with any appropriate load balancers or other routers so that connections with clients 102 can be appropriately distributed. Application 128 then processes connection requests from clients 102 as appropriate. In the embodiment shown in FIG. 1, guide server application 128 contains control logic 132 for controlling remotely-located media devices 104 and a web server or other presentation logic 136 for providing information to client 102 in a web-based or other format that can be conveniently presented to the user.

Various embodiments also provide search engine logic 134 as desired; this search engine may perform an integrated search of information about content that is stored with one or more remote media devices 104, as well as any program guide information 115 and/or information about on-demand programming 112 as desired. Such information 112, 115 may be obtained from any database or other source available to host 116, including any database executing on a separate server or the like. Further information about exemplary search processes that may be implemented using search engine logic 134 is provided below, for example in conjunction with FIGS. 2-4.

Control module 132 contains any appropriate programming logic to establish sessions over network 110 with one or more media devices 104 in response to requests received from clients 102. Such sessions can be used to retrieve information from the media device 104 and/or to provide instructions to the media server as desired. As described below, sessions with media devices 104 may be initiated by through one or more message servers 114 that have pre-established connections with the particular message server 114 to be contacted.

Interactions between host 116 and client 102 may be managed in any manner. In various embodiments, client 102 interacts with host 116 using a conventional web browser 107 that can receive information from a conventional web server module 136 at host 116. Such information may be provide as part of dynamic or active web content (e.g., using ASP, JAVASCRIPT, Cold Fusion, PHP and/or other content, or using JAVA, ACTIVEX and/or other plugins), and/or as static content (e.g., using HTML, XML or similar constructs). In various embodiments, presentation module 136 provides a conventional web page or similar document with embedded active content that allows the user to interact with a program guide or other information using conventional graphical user interface (GUI) constructs. The web page(s) provided from presentation module 136 may also provide a media player application 107, or may simply accommodate and interact with a media player application 107 that resides on client 102.

In various embodiments, host 116 is able to interact with client 102 using web constructs or the like to provide searching of content, remote control of media device 104, viewing of programming stored at media device 104, and/or any other features as desired. Guide server application 128 may provide any alternate and/or additional functions and features as desired. Generally, guide server application 128 is at least partially implemented using conventional compiled object code derived from source code in any programming language (e.g., C, C++ or the like). Other embodiments may make use of an interpreted or other abstracted environment, such as the JAVA environment available from Sun Microsystems of Sunnyvale, Calif. or the .NET environment available from Microsoft Corporation of Redmond, Wash. Other embodiments may implement the various components of guide server application 128 using any other programs, programming languages, scripting languages, development or execution environments, and/or the like. Such programming may be stored in source or object code form on any digital storage medium (e.g., memory, mass storage, removable media, or any other medium) that is accessible to guide server application 128.

Providing a network host that is able to perform searching that considers content stored on a remotely-located media server can present several challenges. Firewalls and other security mechanisms, for example, can make direct communications between the searching host and the media server difficult. As a result, various embodiments provide a system that includes a message server or the like that has established a pre-existing connection 140 with the media server. This pre-existing connection 140 can be leveraged to establish an online session between the host and the media server that allows the host to retrieve real-time (or near real-time) information about media content stored on the media server, thereby allowing for convenient search and management of the stored files, as well as the ability to direct new recordings of future programming, and/or to take other actions as desired.

Unlike techniques that rely upon intermittent polling by the remote device to obtain instructions or other information, various embodiments are able to establish real-time connections 144 between the guide server host 116 and the remote media device 104 through the use of a messaging server 114 that maintains a pre-existing connection 140 with the media server. When a user wants to open a control or other session 144 with the remote media device 104, the pre-existing connection 140 can be used to establish a relatively immediate session with the online host, thereby allowing commands and other messages to be "pushed" to the media server in real-time (or near real time) rather than waiting for the media server to "pull" the information from the host. Various embodiments therefore provide any number of message servers 114 that are each capable of maintaining pre-existing connections 140 over network 110 with one or more media devices 104. Each message server 114 is implemented using conventional computer server hardware, software and/or services, such as any of the hardware or software features described above in connection with host 116.

Message server 114 suitably receives requests from one or more media devices 104 to initiate persistent connections 140 with the media devices 104 in any manner. In various embodiments, each device 104 maintains a relatively constant connection 140 with a messaging server 114 at a uniform resource locator (URL) or other network address that can be readily contacted on network 110. Messaging server 114 may simply be a TCP server, for example, that is automatically accessed when media device 104 starts up, reboots, or otherwise initiates activity on network 110. In such cases, media device 104 contacts the messaging server 114 (with the assistance of an appropriate routing or load balancing features), establishes a TCP or similar connection 140, and then awaits further action. This connection may be kept alive using relatively low bandwidth "keep alive" features that are part of the TCP protocol.

The pre-existing connection 140 that can be used to send instructions or requests to the media device 104, even though the server is behind a firewall or other security mechanism. This is because many routers used in conventional firewalls will allow outgoing TCP connections that are originated within the trusted space while disallowing incoming TCP (and other) connections. After establishing a TCP or other connection 140 from the media device 104 to message server 114, that pre-existing connection can be used to transmit an instruction from message server 114 to media device 104 to establish a separate session 144 with the host 116. This second session 144 can be established as another outgoing TCP (or other protocol) communication from media device 104 that is not likely to be blocked by a firewall. That is, message server 114 can transmit an instruction over the pre-existing channel that directs media device 104 to separately contact host 116. This instruction may optionally include information about the host 116 or other party that is requesting the connection, although this information need not be present in all embodiments. When instructed to do so, media device 104 suitably establishes a TCP or other session 144 with the host 116 that can be used to exchange data and instructions, or to perform other tasks as described more fully below.

Messages sent from message server 114 can then be provided to the media device 104 on a relatively immediate basis. That is, if a server 116 wishes to contact a particular media device 104, the server 116 need not wait until the media device 104 polls the server 116, but rather can provide a message over connection 110 in real-time, or near real-time. This relative immediacy provides a greatly improved user experience, as well as access to a much wider array of features. By providing direct, real-time access to the media device 104, for example, some implementations of the host 116 are able to provide access to most, if not all, of the functionality that would be available from a directly-connected client application, but in a convenient web interface. Various embodiments therefore provide a relatively robust set of functions and features to the viewer that can be conveniently accessed using conventional web or similar features. Other embodiments may provide alternate or additional features, as desired. "Real time" in this context refers to a communication or other action that occurs in response to a stimulus (e.g., a user input, network request or the like) without substantial delay between the stimulus and the action. "Real time" communications, while typically occurring on a generally immediate basis, may nevertheless encounter and account for network and processing delays and other delays that are inherent in practical data communications systems. Various examples of message servers 114 are described in co-pending application (cite to message server app), although other embodiments may incorporate different types of message servers or the like.

Various embodiments of system 100 therefore allow host 116 to establish a real-time or near-real-time session with media device 104 in response to requests received from clients 102. The user of client 102 contacts host 116 by directing a browser 103 or similar program to a URL or other address associated with host 116. Upon receiving a request from client 102, host 116 suitably contacts the appropriate media device 104 by providing an appropriate message 142 to message server 114. In various embodiments, message server 114 responds to message 142 by relaying or transmitting the message to the media device 104 over the pre-established connection 140. After receiving the message over connection 140, the media device 104 contacts host 116 to establish a real-time or other communications session 144. This session 144 is any bi-directional communication that allows messages to be sent and received between host 116 and media device 104, such as a conventional TCP session. After the communication session 144 is established, host 116 can obtain information about programming 105 available to media device 104 using the session 144. Host 116 can also provide any instructions to media device 104 as desired. In various embodiments, multiple messages are interchanged between host 116 and media device 104 using a common session 144 that persists throughout the duration of the interaction between host 116 and media device 104.

FIG. 1, then, shows a system 100 that could support local searching for media content by a media device 104 using search feature 135 and/or remote searching of media content stored on a media device 104 using a guide server host 116 that communicates with the media device 104 and an appropriate client 102 using the internet or another digital network 110. In either or both of these embodiments, any number of different types of searches could be performed, including searches for particular programming from multiple sources or in multiple locations.

One example of a combined search process that is able to provide a combined result that identifies content from multiple sources is described in FIG. 2. Generally speaking, process 200 for identifying desired programming from multiple sources involves obtaining searchable information from one or more sources (function 202), receiving search criteria from the user (function 204), performing the search (function 206), integrating the search results (function 208), and providing the combined search result to the user (function 212). In various embodiments, any sort of prioritization of search results may also be performed (function 210), although prioritization may not be needed in all cases.

Search process 200 may be implemented in any manner. In some embodiments, process 200 provides a local searching feature that can be implemented using search feature 135 of a set-top box or other media device 104. In other embodiments, process 200 may be executed by a search engine 134 executing within a guide server or other host 116 to provide remote searching as appropriate. Still other embodiments may provide integrated searching using the techniques shown in FIG. 2 in any other setting, environment or implementation.

Searchable information may be obtained in any manner (function 202). In various embodiments, process 200 attempts to locate particular search criteria in content received from a television source (e.g., receiver 136), content stored on a DVR (e.g., DVR 105), content available from an on-demand source 112, and/or the like. In various embodiments, some of the information searched may be stored locally with the engine or application that is performing the search. An STB, standalone DVR 105 and/or other media device 104 that performs a local search process 200, for example, may have locally-stored electronic program guide (EPG) data about current and upcoming programming, as well as a listing of content stored in the DVR 105. This EPG data may be obtained from a satellite, cable, broadcast or other source (e.g., signals received by receiver 136) in some cases, or EPG data may be alternately obtained from a server 115 operating on network 110, or from any other source.

A user of a search feature 134 and/or 135 may first authenticate with the guide server host 116 or any other authentication service using a userid/password combination or other credential so that the particular user can be identified and the search experience can be customized to the particular user by considering only content that is actually available to that particular user. This authentication may be readily implemented between client 102 and server host 116 using conventional techniques. After the user is authenticated, search feature 134 and/or 135 suitably obtains search information that corresponds to the particular user. Host 116 may obtain EPG information from a server 115 or other source, for example, that corresponds to the user's particular media device 104 so that the searching considers only the programming that is actually available to the user.

Further, search feature 134 and/or 135 may obtain the user's actual list of stored programs on one or more DVRs 105 and/or other sources, as appropriate. This information may be obtained in any manner; in various embodiments, the guide server host 116 provides a message 142 (FIG. 1) to the message server 114 that has a pre-established connection 140 to the particular media device 104 that is associated with the user. This message 142 may then prompt the media device 104 to establish a communications session 144 with the host 116 to facilitate real-time communications over network 110. Session 144 can therefore be used to obtain a list of programs stored on DVR 105, as well as to provide commands, information queries and/or other communications as desired. This process may be repeated as desired so that information may be obtained from multiple DVRs 105 or the like, thereby allowing a user to search for content that may be stored across any number of multiple devices 104.

In either local or remote processing embodiments, on-demand content and guide information about the on-demand content may be obtained from any source 112. Such information may be obtained on a query-based basis (e.g., wherein search features 134 and/or 135 provide search criteria to a server 112 to obtain particular results regarding the provided criteria). Alternately, a database of available on-demand content may be provided on any regular or irregular basis so that the search feature 134 and/or 135 can search the database as desired.

Search criteria may be received in any manner (function 204). In local processing embodiments, search criteria may be received using an electronic program guide feature or other conventional user interface features of the STB, DVR or other local media device 104. In remote processing embodiments, search criteria may be obtained from the user via client 102, which may provide a text entry window or other user interface feature that allows entry of search criteria into browser 103 or the like. Information entered at browser 103 may be provided, using conventional network constructs, from client 102 to host 116 for further processing.

Search query information may be provided in any format, and may contain any desired information. In some embodiments, a viewer may be able to variously search for content by title, actor/actress name, channel number, network, genre and/or any other criteria as desired. A viewer may search for episodes of "The Colbert Report", for example, by entering the words "Colbert" and "report" into a text window or other interface feature. Various embodiments of search engine 134/135 may also allow searching for "News", "Comedy", "channel 51", "ESPN" or any other search criteria as desired.

Searching may be performed in any manner (function 206) that identifies the search criteria in the available content. In various embodiments, simple GREP-type keyword searching may be sufficient to identify the presence of some or all words in the search criteria in the lists of available content. In other embodiments, more advanced searching (e.g., searching that considers approximate matches or the like) may be performed. As noted above, some searching may involve transmitting a query to a remote server 112, 115 or the like.

Searching of multiple lists or databases (e.g., lists of EPG programming or contents of a DVR 105) may be searched sequentially or in parallel, or in any other convenient manner. The results of the search may then be integrated in any manner (function 208) to obtain a combined search result. Integrating may involve simply formatting the results of two or more searches in any manner.

Search results may also be prioritized, as desired. In some searches, the list of results may provide more options than the user can quickly digest. An open-ended search query (e.g., a search for "movies" or "comedy"), for example, could return dozens of results stored on a DVR or hundreds (or more) options in upcoming programming or on-demand choices. Similarly, some keywords may have different meanings in different contexts: a search for "bears", for example, might produce results that identify nature programs in addition to Chicago Bears football games. Various embodiments therefore prioritize the search results in any manner so that the options most likely to appeal to the user are listed first, or otherwise made more prominent than results that are less likely to be appealing. One technique for optimizing search results is shown in FIG. 4 below, although any number of other techniques could be used in equivalent embodiments. Prioritizing may not be needed in all embodiments or all searches; for example, if the search results are short enough that the results can be readily interpreted by the user, then prioritization may not be needed for that search, whereas longer search results may be prioritized as needed and desired.

Search results may be provided to the user in any manner (function 212). In local processing embodiments, results may be simply provided on display 106 via interface 143. Remote processing embodiments could provide a web page or other interface from host 116 to client 102 to present the results to the user as desired.

An example of an interface 300 showing combined search result 300 is shown in FIG. 3. This interface 300 is intended simply to show the types of features that may be provided in some embodiments; in practice, actual interfaces may be organized differently, may present additional or different information, and may provide additional or different interface features as desired.

In the example shown in FIG. 3, the user has searched for a particular "Programs". Search results have been provided from a search feature 134 and/or 135 that identifies various episodes of the program that are available from different sources. In this particular example, three episodes 302 are identified as available on the user's DVR 105. Additionally, three upcoming episodes 304 are identified on two different broadcast, cable or satellite channels available to the media device 104. Moreover, any number of on-demand episodes 306 are available from an on-demand source. The results shown in FIG. 3 may be supplemented or modified in any manner.

After being presented with the combined information from multiple sources, the user is able to conveniently select desired programming from any of the available sources using a common search result 300, as shown. In various embodiments, the user may be able to play identified content, erase identified content, set timers for future recordings, and/or take any other actions as desired. A "play" feature 312 and/or an erase feature 310 may be provided for episodes 302 stored on DVR 105, for example. Upcoming episodes 304 may be recorded by selecting a "record" feature 314 as appropriate, and/or currently available content (e.g., current broadcasts from receiver 136 or on-demand programs 306) may be retrieved or played using a "play" feature 316, as desired. The particular features and interface elements used to implement the various features may vary from embodiment to embodiment, as appropriate.

In local processing implementations, the "play", "record", "erase" or other features may be processed locally by a STB or other media device 104. In remote processing implementations, guide server host 116 may respond to user inputs by directing the remote media device 104 through messages transmitted over session 144 (FIG. 1) as desired. Host 116 may instruct media device 104 to tune to a particular channel for recording the received content to DVR 105, for example, or to placeshift the content to media player 107 as desired. Host 116 may also direct media device 104 to set recording timers for future programming, to delete a program stored in DVR 105, to adjust a setting of media player 107, to adjust playback of programming (e.g., "play", "pause", change a channel) on media device 104, to otherwise control operation of media device 104, and/or to take any other actions as may be desired.

Again, the particular appearance, layout, arrangement, content and features provided by interface 300 may vary significantly from embodiment to embodiment. In the illustrated example, however, the user is able to locally or remotely perform a simultaneous search for programming content available from a DVR 105, a broadcast, cable or satellite source 136, and/or an on-demand source 112, and to obtain a combined search result. This combined result may allow further actions to obtain, view, delete or otherwise process the content received from any number of different sources.

Various embodiments may provide additional or alternate features beyond integrated searching. FIG. 4, for example, shows an exemplary process 400 that could be used to prioritize the results obtained from a search of one or more content sources at any sort of data processing system. Process 400 may be particularly useful if the results of a search (e.g., search function 206 in FIG. 2) contain a relatively large number of programs, although prioritization may be used with any search results as desired. Process 400 may be executed on any sort of media device 104, guide server host 116, computer or other data processing system as desired.

Generally speaking, process 400 assigns a numeric weight to each of the search results. The weight is assigned based upon various factors, such as viewer preferences and whether the viewer has previously expressed an interest in the particular program. If a viewer has previously recorded episodes of the program or set a timer for future episodes, for example, the weighting can be increased so that the program is made more prominent in the search results. Conversely, the weight can be reduced if the recorded programs remain relatively unwatched for any length of time.

The search process may be performed as described above, or in any other manner. In various embodiments, search information is obtained (function 402) in any manner. Search criteria may be received, for example, from a local or remote interface, and information about the programming content to be searched may be similarly processed using any sort of local or remote data processing system as desired. Various implementations, for example, could receive search criteria from the user as well as information about the contents of DVR 105, EPG data, on-demand data and/or the like in a manner similar to that described with respect to functions 202 and 204 above.

Search results are obtained in any manner (function 404), such as in a manner similar to function 206 above. Various embodiments of process 400 may be applied to search results obtained from a single source of programming data (e.g., EPG data, or information about programs stored on DVR 105), however. It is not necessary that the search results be obtained from multiple sources.

Search results may be prioritized in any manner, considering any type of factors or other criteria. In various embodiments, each program or other item identified in the search result is individually considered (function 406) to assign a numeric or similar weighting that indicates the priority of the particular result. Other embodiments may group items (e.g., different episodes of the same program) in any manner to expedite processing, to further streamline the information provided to the viewer, and/or for any other purpose. In the embodiment shown in FIG. 4, the weight for each program is initially set to zero or another neutral value (function 408).

Various embodiments consider user preferences in adjusting the weight of the item (function 410). If a user has previously indicated a "like" or "dislike" of the program, for example, the weight can be correspondingly increased (function 414) or decreased (function 412). While FIG. 4 shows an increased value of "3" associated with user approval and a decreased value of "10" associated with viewer disapproval, the absolute and/or relative values used in other embodiments may be different.

The weight assigned to the particular item may be further adjusted based upon whether the viewer has previously indicated an interest in the programming series associated with the item (function 416). If a viewer has previously recorded different episodes of the same program, for example, the weight assigned to that item can be increased (function 418). FIG. 4 shows that the amount of increase may be based upon the number of different episodes that are recorded. If a viewer has saved multiple episodes of the same program in this example, search results corresponding to that program will have their weight increased according to the number of episodes saved. This increase may be tempered in some embodiments by the length of time that the program has remained in storage (function 420). The amount of increase or decrease may be constrained as desired to prevent an undue increase in weight due to a large number of programs (e.g., duplicate episodes of the same program) in storage, or to prevent an undue decrease in weight due to programming that has been stored for a relatively long time.

Even if the user does not have current recordings of a program on his or her DVR 106, the user may still have a particular interest in the program or series if he or she has set a recording timer (function 422) for the item considered, or another program in the same series. In such embodiments, the weight for the item may be increased (function 424) by an appropriate amount to reflect the user's interest.

After weights have been determined for an appropriate number of results (function 406), the results can be ranked, sorted or otherwise ordered (function 426), and provided as an output (function 428) as desired. As noted above, results may be provided on a display 106, on a browser application 103 executing on a client 102, or in any other manner.

The particular process 400 and weighting values shown in FIG. 4 are purely exemplary. Alternate embodiments may use different absolute or relative weights for each of the various factors considered, may consider additional or alternate factors, and/or may arrange the processing in a logical manner other than that expressly shown in FIG. 4. Further, as noted above, process 400 and its equivalents may be performed on any sort of data processing system, including any sort of STB, DVR or other media device 104, or any sort of guide server host 116.

FIGS. 1-4 therefore illustrate at least one example of a system 100 that could be used to locally or remotely search content available at a DVR, STB or other receiver, placeshifting device, file server or other media device 104. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents. The term "exemplary" is used herein to represent one example, instance or illustration that may have any number of alternates. Any implementation described herein as "exemplary" is not necessarily to be construed as preferred or advantageous over other implementations.

What is claimed is:

1. A method executable by a data processing system to identify desired media programming, the method comprising:
receiving, by the data processing system, search criteria provided by a user that indicates the desired media programming;
requesting and obtaining a second listing of media programming from a remotely-located digital video recorder that is associated with the user;
searching, by the data processing system, for the search criteria in both of a first listing of media programming available from an electronic program guide and in the second listing of media programming obtained from the remotely-located digital video recorder that is associated with the user to thereby create a combined search result that includes first instances of the search criteria that are found in the first listing and second instances of the search criteria that are found in the second listing;
prioritizing the combined search result based at least in part upon whether the user has previously recorded programs associated with one or more of the instances using the digital video recorder, wherein the prioritizing is adjusted based upon an age of the previously recorded programs stored on the digital video recorder so that instances associated with more recently recorded programs have a higher priority than instances associated with less recently recorded programs; and
providing the combined search result from the data processing system to thereby allow instances of the search criteria appearing in either the first or the second lists that are most likely to appeal to the user to be displayed more prominently than instances of the search criteria that are less likely to appeal to the user.

2. The method of claim 1 further comprising the data processing system requesting and obtaining media programming from the remotely-located digital video recorder, wherein the obtained media programming is selected by the user from the combined search result.

3. The method of claim 1 wherein the prioritizing further comprises adjusting the search result based on a future recording planned for the digital video recorder.

4. The method of claim 1 further comprising determining whether the user is interested in a programming series, and, if the user is interested in the programming series, adjusting the prioritizing by making the programming series more prominent in the combined search result.

5. The method of claim 4 wherein the prioritizing comprises identifying a future recording associated with the programming series that is planned for the digital video recorder.

6. The method of claim 4 wherein the prioritizing comprises identifying episodes of the programming series in the listing of files stored on the digital video recorder.

7. The method of claim 1 wherein the listing of media programming comprises content is selected from at least one of a satellite, a cable and a broadcast source of television content.

8. The method of claim 7 wherein the files stored on the digital video recorder are pre-recorded programming files that are associated with the user.

9. The method of claim 1 further comprising receiving, at the data processing system, identification credentials that identify the user, identifying the remotely-located digital video recorder that is associated with the user based upon the identification credentials, and obtaining the second listing of media programming from the remotely-located digital video recorder.

10. The method of claim 9 comprising initiating contact with the remotely-located digital video recorder over the digital network, establishing a session with the remotely-located digital video recorder, and receiving the second listing from the remotely-located digital video recorder via the session.

11. The method of claim 10 wherein the initiating comprises contacting a message server having a pre-existing connection with the remotely-located digital video recorder.

12. The method of claim 11 further comprising authenticating the user, and wherein the initiating is performed in real-time in response to a successful authentication.

13. The method of claim 1 wherein the data processing system is a media server, wherein the first listing comprises an electronic program guide listing programming available to the media server via at least one of a broadcast, a satellite and a cable television source, and wherein the second listing comprises a listing of pre-recorded programming files stored on the digital video recorder.

14. The method of claim 13 wherein first listing is received via the at least one of the broadcast, the satellite and the cable television source.

15. The method of claim 1 further comprising combining the instances of the search criteria found in both the first and the second listings of media programming into a common search result.

16. The method of claim 1 further comprising further prioritizing the search result based on a viewer preference.

17. The method of claim 1 further comprising identifying instances of the search criteria available from an on-demand programming source in the combined search result.

18. A system that communicates via a network with a client and a remotely-located digital video recorder having stored programming content that is associated with a user, the system comprising:
a message server configured to communicate with the remotely-located digital video recorder via the network using a pre-existing connection; and
a guide server configured to receive a request from the client via the network, to direct the message server to send a message to the remotely-located digital video recorder via the pre-existing connection in response to the request, to establish a session via the network with the remotely-located digital video recorder, to receive information about the media content stored at the remotely-located digital video recorder via the session, to receive search criteria from the client, to search for the search criteria in both program guide information and in the information about the media content stored at the remotely-located digital video recorder, and to provide a combined search result to the client that identifies instances of the search criteria found in at least one of the program guide information and in the media content stored at the remotely-located digital video recorder, wherein the combined search result is prioritized based at least in part upon whether the user has previously recorded programs associated with one or more of the instances using the digital video recorder so that instances of the search criteria that are most likely to appeal to the user are made more prominent than instances of the search criteria that are less likely to appeal to the user, wherein the prioritizing of the combined search result is adjusted based upon an age of the previously recorded programs stored on the digital video recorder so that instances associated with more recently recorded programs have a higher priority than instances associated with less recently recorded programs, and wherein the pre-existing connection is established between the message server and the remotely-located video recorder prior to the guide server receiving the request from the client.

19. The system of claim 18 wherein the guide server is configured to identify the search criteria in available on-demand programming in the combined search result.

20. The system of claim 18 wherein the guide server is configured to prioritize the search result based on the information about the media content stored at the remotely-located digital video recorder.

21. A system comprising:
a receiver configured to receive television programming and an electronic program guide, wherein the electronic program guide describes the television programming that is available to the receiver;
a digital video recorder associated with a user that is configured to store a plurality of programs received as part of the television programming; and
a controller configured to receive search criteria from the user, to identify the digital video recorder associated with the user and obtain a listing of the plurality of programs stored on the associated digital video recorder from the associated digital video recorder, to search for the search criteria in both the electronic program guide and in the plurality of programs stored on the digital video recorder, and to provide a combined search result to the user that identifies instances of the search criteria found in both the electronic program guide and in the plurality of programs stored on the digital video recorder, wherein the combined search result is prioritized based at least in part upon whether the user has previously recorded programs associated with one or more of the instances using the digital video recorder, and wherein the prioritizing of the combined search result is adjusted based upon an age of the previously recorded programs stored on the digital video recorder so that instances associated with more recently recorded programs have a higher priority than instances associated with less recently recorded programs so that instances of the search criteria that are most likely to appeal to the user are made more prominent in the combined search result than instances of the search criteria that are less likely to appeal to the user.

22. The system of claim 21 further comprising an interface to a network having a source of available on-demand programming, and wherein the controller is configured to identify instances of the search criteria in the available on-demand programming in the combined search result.

23. A method executable by a data processing system, the method comprising:

identifying a first plurality of programs listed in an electronic program guide and a second plurality of programs stored on a remotely-located digital video recorder associated with a user, wherein the first and second pluralities of programs both match common search criteria provided by the user;

determining a score for each of the programs in the first and second pluralities of programs, wherein the data processing system determines the score for each program based at least in part upon whether or not the program is associated with content recorded by a digital video recorder and based at least in part upon an age of the previously recorded programs stored on the digital video recorder so that more recently recorded programs have a higher priority than less recently recorded programs;

ranking the plurality of programs according to the score determined for each program to thereby create a combined search result that includes programs from both the first plurality of programs and the second plurality of programs, wherein the combined search result is ordered so that programs that are most likely to appeal to the user are made more prominent in the combined search result than instances of the search criteria that are less likely to appeal to the user; and providing the combined search result for presentation to the user.

24. The method of claim 23 wherein the determining comprises identifying a future recording of the program by the digital video recorder, and, if the future recording of the program is identified, increasing the score of the program.

25. The method of claim 23 wherein the determining comprises identifying an interest in a series associated with the program.

26. The method of claim 25 wherein the determining comprises increasing the score for each instance of the program contained in the content recorded by the digital video recorder.

27. The method of claim 23 wherein the determining comprises adjusting the score based upon a user preference associated with the program.

* * * * *